UNITED STATES PATENT OFFICE.

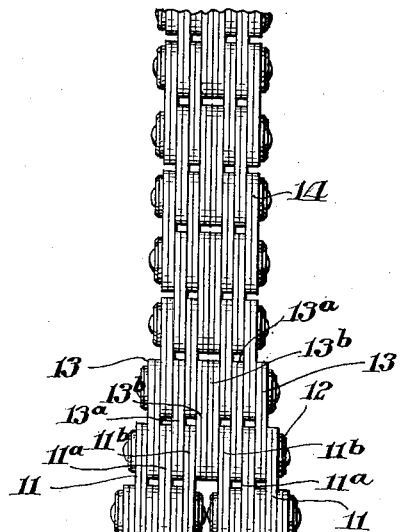
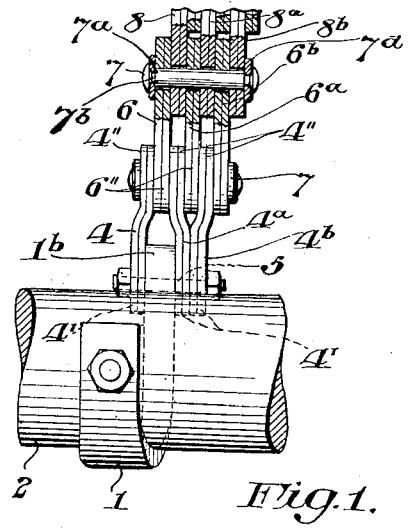
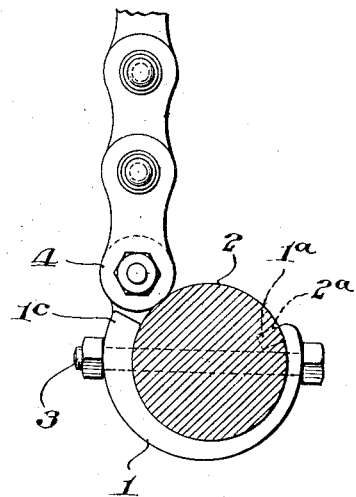
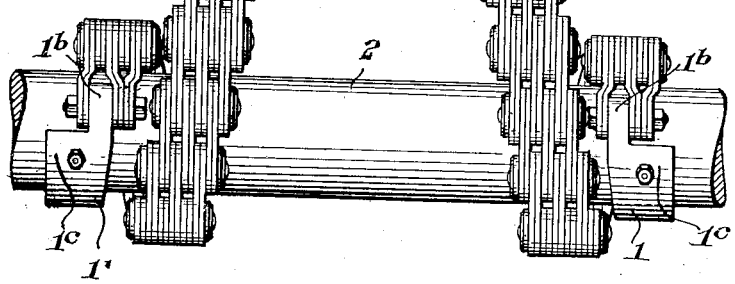

RICHARD L. BINDER, OF PHILADELPHIA, PENNSYLVANIA.

CHAIN.

1,329,034.  Specification of Letters Patent.  Patented Jan. 27, 1920.

Application filed July 11, 1919. Serial No. 310,169.

*To all whom it may concern:*

Be it known that I, RICHARD L. BINDER, a citizen of the United States, residing in the city of Philadelphia, county of Philadelphia, and State of Pennsylvania, have invented certain Improvements in Chains, of which the following is a specification.

My invention relates to improvements in chains adapted to be wound directly on revolving shafts in convolutions of constant character or without winding one upon another.

The improvements are designed to effect a better connection or anchorage of the chain, increased strength as well as durability, and a balanced action.

In the drawings, Figure 1 is a broken part sectional view illustrating improvements of my invention. Fig. 2 is a broken part sectional view of the same at right angles to the position in Fig. 1, and Fig. 3 is a broken plan view illustrating a special form of the chain.

The chain illustrated comprises an anchor 1 fitted to the shaft 2 around more than half of which it extends. The anchor has at one end a tooth $1^a$ set in a radial socket $2^a$ of the shaft and at the opposite end an eye $1^b$ for the engagement of the links, the anchor tapering from a shoulder $1^c$ (from which the eye is offset) to the tooth $1^a$ from which the eye is likewise offset. A bolt 3 extends through the ends of the anchor 1 and the center of the shaft 2 whereby they are secured together firmly in closely fitting relation.

Laminated links 4, $4^a$ and $4^b$ have, respectively, end eyes 4' and 4'' offsetting relatively, the laminated link 4 having its eye 4' in registration with eye $1^b$ directly in front of the shoulder $1^c$ with its offset eye 4'' projected toward the central plane of such eye $1^b$; the laminated link $4^a$ has its eye 4' engaged with the eye $1^b$ opposite the eye 4' of the link 4 and its eye 4'' projected toward the central plane of the eye $1^b$, and the laminated link $4^b$ has its eye 4' in registration with eye 4' of the link $4^a$ and its eye 4'' projecting oppositely to the eye 4'' of the link $4^a$. A bolt or pin 5 passes through the eyes $1^b$ and 4' to connect the parts 1 and 4, $4^a$ and $4^b$.

Laminated links 6, $6^a$ and $6^b$ have eyes 6'' which lie respectively between and opposite to the eyes 5'', to form a compound link which is hingedly connected by the pin 7 in offset relation to the first compound link 4, $4^a$ and $4^b$.

Laminated links 8, $8^a$ and $8^b$, similar to the links 6, $6^a$ and $6^b$, are hingedly connected thereto in offset relation by a pin 7.

The pins 7 are provided with bodies having shoulders $7^a$ beyond which extend reduced upset ends $7^b$ for holding washers $7^d$ thereon against the shoulders, the pin bodies taking the shearing stresses and wear due to the actions of the links connected thereby.

As illustrated in Fig. 3, right and left hand chain sections 10 and 10' are connected with the shaft 2 by anchors 1 and 1', the sections 10 and 10' being inclined symmetrically to the plane passed at right angles through the shaft 2 midway between the similar points of the anchor 1 and 1'.

The end links 11, $11^a$ and $11^b$ of the respective sections 10 and 10' are connected by a pin 12 with the links 13, $13^a$ and $13^b$, the links 13 lying between links 11 and $11^a$, the links $13^a$ lying between links $11^a$ and $11^b$, and the juxtaposed links $13^b$ lying between the links $11^b$. The structure is continued by the section 14 disposed centrally with reference to the branching sections 10 and 10' which wind upon the shaft.

Having described my invention, I claim:—

1. The combination with a shaft, of an anchor conforming to said shaft, a bolt passing through said shaft and the separated ends of said anchor, and a flexible tension member connected with an end of said anchor and adapted to be wound on said shaft.

2. The combination with a shaft, of a tapered anchor conforming to said shaft, said anchor having an offset eye, a bolt passing through said shaft and the ends of said anchor, and a flexible tension member connected with said eye and adapted to be wound on said shaft.

3. The combination with a shaft, of an anchor conforming to said shaft, said anchor having a tooth set in said shaft and an eye transverse to said shaft, a bolt passing through said shaft and the ends of said anchor, a flexible tension member having eyes between which said eye first named is disposed, and a pin extending through said eyes.

4. A chain having branches diverging in opposite directions, each branch having its succeeding links offset from the preceding link.

5. The combination with a shaft, of an anchor having an eye fixed to said shaft, a chain having compound relatively offset links with registering eyes, and pins passing through said eyes, said chain having a compound end link with oppositely offset eyes between which the eye of said anchor is disposed, and a pin connecting said end link and anchor.

6. The combination with a shaft, of an anchor having an offset eye connected with said shaft, a chain having offset compound links comprising an end link having a greater number of its members on one side of said eye than on the other, and a pin connecting said members with said eyes.

Signed at the city of Philadelphia, in the county of Philadelphia, and State of Pennsylvania, this 10th day of July, 1919.

RICHARD L. BINDER.